United States Patent
Hargrove

[11] Patent Number: 5,944,596
[45] Date of Patent: Aug. 31, 1999

[54] FISH SCALING DEVICE

[76] Inventor: Alonzo R. Hargrove, 49097 Hilldale Dr., Austin, Tex. 78723

[21] Appl. No.: 09/067,985

[22] Filed: Apr. 29, 1998

[51] Int. Cl.$^6$ .................................................. A22C 25/02
[52] U.S. Cl. ........................... 452/105; 452/194; 452/195
[58] Field of Search .................................... 452/105, 101, 452/194, 195, 196, 98

[56] References Cited

U.S. PATENT DOCUMENTS

| | | | |
|---|---|---|---|
| 615,432 | 12/1898 | Court | 452/105 |
| 2,110,341 | 3/1938 | Rindt | 452/105 |
| 2,492,606 | 12/1949 | West . | |
| 2,795,006 | 6/1957 | Stephenson | 452/105 |
| 2,913,760 | 11/1959 | Engle, Jr. | 452/195 |
| 3,015,841 | 1/1962 | Reutz | 452/195 |
| 3,248,751 | 5/1966 | Wiborn . | |
| 4,258,452 | 3/1981 | Adcock et al. | 452/105 |
| 4,454,628 | 6/1984 | Olson | 452/194 |
| 5,230,652 | 7/1993 | Alam | 452/98 |
| 5,232,395 | 8/1993 | Rushing | 452/105 |

Primary Examiner—Willis Little
Attorney, Agent, or Firm—Joseph N. Breaux

[57] ABSTRACT

A fish scaling device which comprises a scaler box and a hand held scaler. The scaler box is rectangular in shape and includes a top surface with a multiplicity of horizontally placed indented bars which indentions resemble the profile of the length of the fish which assist in holding a fish in a secured position wherein the top surface also includes a means for securing the nose of the fish, while the top surface also includes a multiplicity of horizontal elongated perforations which allow removed scales from the fish to fall into an interior of the box for storage and disposal after the scaling procedure. The hand held scaler resemble a kitchen style grader and includes a oval shaped handle with a crescent shaped hollow half sectioned scale deflector which prevents the scattering of removed fish scales, and a bottom concave surface corresponding to a fish body curvature and vertically placed perforation style spacers on said bottom surface for allowing free movement of the hand scaler over a fish body when in use. The fish scaling device provide an effective means for scaling a fish and maintaining the scales of a fish in a confined area which is easily and quickly cleaned for storage.

4 Claims, 2 Drawing Sheets

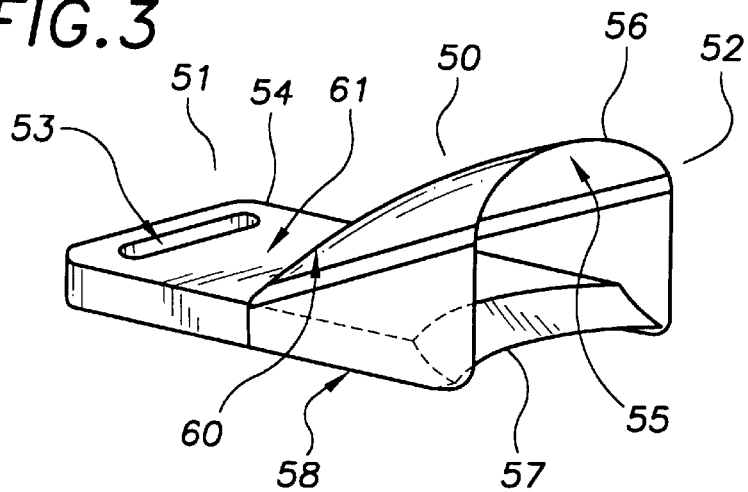
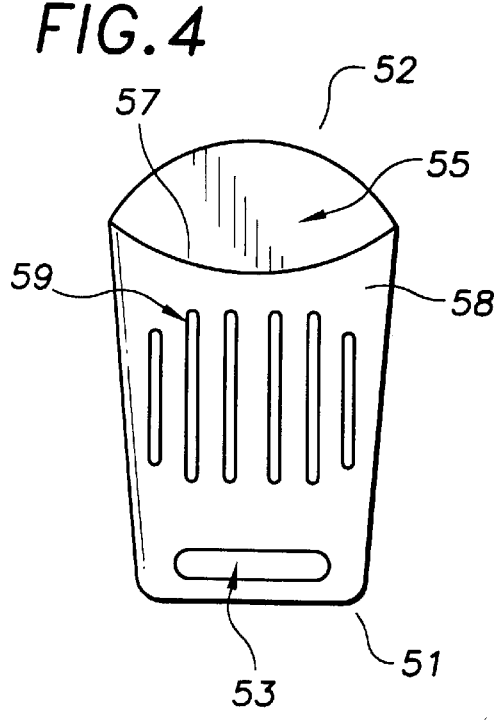
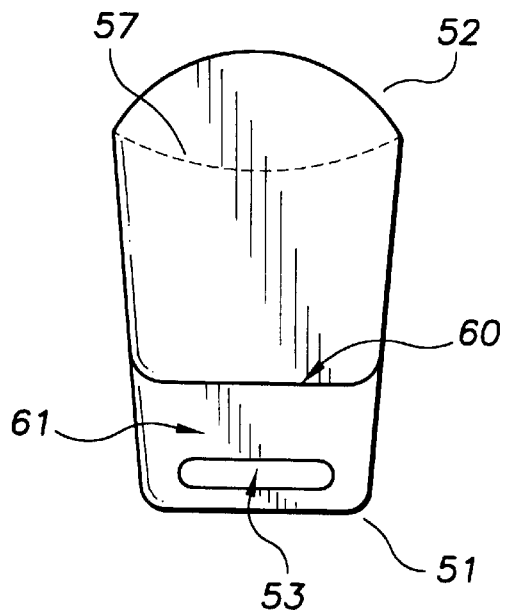

FISH SCALING DEVICE

TECHNICAL FIELD

The present invention relates to devices and methods for scaling fish and more particularly to devices and methods for scaling fish which comprises a scaler box and hand held scaler wherein the scaler box secures a fish while scaling and also functions as a receptacle to receive scales removed from said fish while the hand held scaler includes a scooped scale deflector which prevents scales from scattering while scaling the fish and directs removed scales to the scaler box receptacle for disposal allowing the scaling procedure to be performed indoors without making a mess.

BACKGROUND ART

The have been numerous devices disclosed which are designed to provide a means for easily scaling a fish. The prior devices are directed to either securing a fish in place while scaling or to hand held devices for removing scales from a fish. Scaling a fish has long been known to pose particular problems which include: securing a slippery fish while preforming the scaling procedure, the need for an efficient hand held scaling tool, and the mess associated with the scaling procedure scattering removed fish scales about the work area. As will be shown below the prior devices are useful for their given purposes however they do not provide an effective means for securing a fish in place on a scaling platform which platform also provides a removed scale receptacle container with a hand held scaling tool which deflects removed scales and prevents scales form scattering and further directs the removed scales to be collected in the scale receptacle rather than allowing the scales to scatter thereby allowing the procedure to be performed indoors.

The present invention provides a means for scaling a fish while the fish is secured on a scaling box while using a hand held scaling device while the hand held scaling device also includes a scale scoop deflector which prohibits scales from scattering to undesirable locations while scaling the fish, allowing the scaling procedure to be performed indoors. The present invention thus solves a long felt need to provide an apparatus which provides an effective means of scaling a fish indoors.

Prior art fish scaling apparatuses are as follows:

Rushing, U.S. Pat. No. 5,232,395 discloses a block type member with a handle on the top thereof and a fish scaling surface. This device is extremely useful for scaling fish outdoors and in other areas where the spreading of scales is not of concern. Additionally, this device does not include the means as the present invention to prevent the spread ing of fish scales during the scaling process. This device also does not include a means for securing a fish during the scaling process, nor a means for collecting the removed fish scales in a receptacle.

Alan, U.S. Pat. No. 5,230,652 discloses a hand held dual cutting blade fish scaling device wherein the dual blades include a pair of upper sharp surfaces having mutually opposed end points each being convex in shape and defining a gap there between. The convex surfaces adapt to the inner visceral concave surfaces of the inside of the fish being clean. The device also includes a electrically powered and embodiment of the cutting blade apparatus. The electrical powered device also includes a means for collecting scales as the scales are removed from the fish by the rotating power device. This invention is an extremely useful scaling device however this device does not provide a hand operated fish scaling device as the present invention which prevents the scales from scattering during the process additionally the Alan device does not include a means for effectively securing a fish in place during the fish cleaning operation as a present invention, nor does it include a means for collecting the scales in a receptacle for disposal.

Dilborn, U.S. Pat. No. 3,248,751 discloses a fish cleaning device which readily secures and holds a fish in proper position for scaling which includes a clamping means for the mouth and tail of said fish. This device is extremely useful in providing an effective means for securing a fish during the scaling operation. However, the device does not provide a complete system as the present invention for securing a fish to be scaled, providing a removed scale collection receptacle, and a hand held scaling device which prevents the removed scales from scattering and further directs the removed scales to the removed scale receptacle so that the scaling procedure can be performed indoors.

West, U.S. Pat. No. 2,492,606 discloses a fish scaling device which is fitted with shields to prevent flying scales removed from the fish to be confined to a minimum area and thus facilitates the cleansing of the tool and the surface in which the fish is scaled and adjacent surroundings after scaling. This device is also extremely useful as a hand held scaling device which deflects scales back to an area where the fish is scaled. However this device does not include a complete system as the present invention wherein a scaler box is provided which performs the function of securing a fish in position and a means for collecting removed scales from the fish while a hand held scaler with a fish scale deflector deflects scales back to a removed scale receptacle for disposal.

As will be shown below the present invention solves numerous problems associated with scaling fish. Namely the present invention provides an effective means for securing a fish during the scaling procedure. The present device provides a useful hand held scale deflecting tool which both scales the fish and deflects scales to a removed fish receptacle thus minimizing the mess associated with scaling fish so that the procedure can be accomplished indoors.

GENERAL SUMMARY DISCUSSION OF INVENTION

It is thus an object of the invention to provide a Fish Scaling Device that comprises a fish scaling box and a hand held fish scaler which is particularly adapted for use indoors for scaling fish without leaving a mess and scattering fish scales around the fish cleaning area indoors.

It is a further object of the invention to provide a Fish Scaling Device that comprises a hand held fish scaling apparatus which includes a fish scale scoop deflector which deflects removed fish scales back to a removed fish scales receptacle thereby confining the fish scales to a minimal area, wherein the fish scaling device also includes a fish scaler box which comprises a means for securing the fish in position on an upper surface of said scaler box and furthermore wherein said upper surface includes a multiplicity of horizontal slots which allow removed fish scales to fall into a removed fish scale receptacle area of the scaler box for collection and disposal.

It is a still further object of the invention to provide a Fish Scaling Device that includes a fish scaler box and hand held fish scaler both of which may be manufactured and assembled with a minimal if expense, materials and effort and which devices are easily cleaned after use and while also being extremely durable in manufacture.

Accordingly a fish scaling device is provided which comprises a hand held scaler and a scaler box. The hand held scaler component resembles a kitchen style grader in shape and is manufactured of ABS plastic and/or stainless steel. The front of the scaler incorporates an oval shape opening which serves as a handle for hand held use. Located on top of both sides of the scaler is a pair of diametrically placed raised edges. The raised edges provide an angle protrusion to prevent the user's hand from contacting the fish or the scaler box component when in use. The rear of the scaler embodies a crescent shape hollow half section which is designated a scoop scale deflector. The top of the scoop scale deflector serves to prevent fish scales from propelling and scattering to undesirable locations when the fish scaler is in use. The bottom of the scoop scale deflector incorporates a blunt scaling type stainless steel edge for removal of scales from the fish. The bottom of the scaler also incorporates a concave curved surface featuring a series of nine vertically placed perforation style guides which allow the unit to move freely over a fish when in use. The scaler box component is rectangular in shape and also manufactured of high impact ABS plastic. The length of the box may vary depending upon the size of the fish to be cleaned. The top of the scaler box incorporates a series of horizontally indented bars which indentions resemble the profile of a fish shape. Located beneath each indented bar is a horizontal elongated slotted perforation which allows the scales of the fish to drop into a scaler box receptacle drawer when in use. The top front exterior of the scaler box incorporates an inverted "V" shaped plastic stop, which serves to prevent a fish from being pushed off the unit while utilizing the hand held scaler. The rear of the scaler box features a forward sliding plastic drawer running the length of the unit interior. This drawer stores fish scales when in use. The front of the drawer features a "U" shaped plastic handle which provides access to the unit interior when in use. The scaler box and hand held scaler provide an effective means for scaling fish indoors without making a mess.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 is an isometric view of the hand held fish scaler.

FIG. 4 is a bottom view of the hand held fish scaler.

FIG. 5 is a top view of the hand held fish scaler.

EXEMPLARY MODE FOR CARRYING OUT THE INVENTION

It can be seen from the following description that the fish scaling device which includes a scaler box and hand held fish scaler is used while for scaling fish. The user will preferably place the scaler box onto a flat surface such as a kitchen counter or table. The user will then place a fish onto the top surface of the scaler box and place the fish head into the "V" shaped stop located on the scaler box top surface. The user would then slide the bottom of the hand held scaler over the fish until the scales have been removed, the user would then turn the fish to scale the other side of the fish. While in use, the hand held fish scaler deflects scales removed from the fish back to the immediate area of the fish scaled and onto the scaler box top surface wherein the fish scales then fall through the series of horizontally elongated perforations and into the scaler box receptacle drawer. The device is easily cleaned and removed of scales by rinsing the hand held scaler and the scaler box and then storing.

Figure 1:
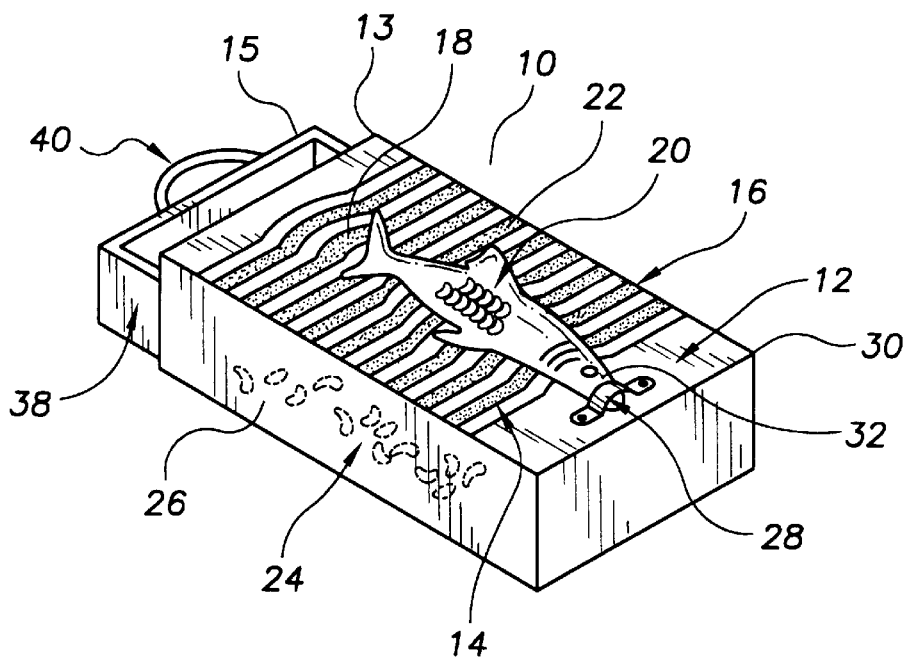
FIG. 1 is a isometric view of the fish scaler box illustrating a fish secured in place ready to be scaled.
Figure 2:
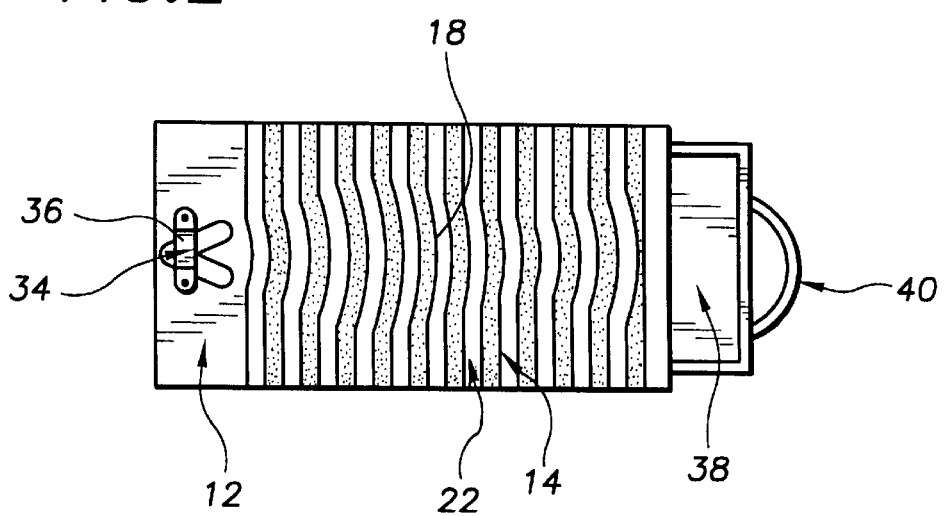
FIG. 2 is a top view of the fish scaler box illustrating the indented scaling bars and other features on the top surface of the scaling box.

Referring to the drawings in detail FIG. 1 illustrates the scaler box 10 which is rectangular in shape and preferably manufactured as a high impact ABS plastic. The rectangular dimensions scaler box 10 measures approximately two inches in height, five inches in width, and twenty four inches in length. The width and length of the box may vary depending upon the size of fish to be scaled. For example the fish scaler box maybe supplied in a length of up to three feet and twelve inches in width, or as short as one foot and four inched in width without deviating from the present concept. The top 12 of the scaler box includes a series of horizontally placed indented bars 14 which extend from each long side 16 of the rectangular scaler box 10. The horizontally placed indented bars 14 includes a indented portion 18 which helps maintain a fish 20 on the top surface 12 of the scaler box 10. The indented bars 18 are indented to resemble the profile of the length of the fish 20. When a fish is placed on the top surface 12 and within the indented portion 18 of the bars 14 the fish is within a valley formed by the indented portion 18 and thus helps maintain the fish on the top surface 12 of the scaler box 10. Between each horizontal indented bar 18 is an elongated horizontally positioned perforation 22 which also extends between the rectangular long sides 16 of the top surface 12 of the scaler box 10. The horizontal elongated perforations 22 provide a space for fish scales 24 to fall from said fish 20 into an interior 26 of the scaler box. A fish head securing means 28 is positioned on the top front exterior 30 for securing a fish head 32 in place. The fish head securing means 28 is preferably a "V" shaped plastic stop 34 with a securing strap 36 for maintaining the fish head within said "V" stop. This type of fish head securing means is a passive type securing means whereby the fish head 32 is merely placed within the "V" shaped area and maintained in this area by the scaling action using the hand held scaler 50 which is naturally accomplished by pushing the scaler 50 from the fish tail toward its head 32, this motion tends to push the fish head-first and consequently results in the head 32 being shoved into the "V" shaped area 28 and secured.

The rear of the scaler box 13 includes a forward sliding drawer 38 which runs the length of the unit interior 26. The drawer 38 serves as a storage area for fish scales 24 which fall through the multiplicity of horizontal elongated perforations 22. The front of the drawer 15 includes a "U" shaped plastic handle 40 that provides access to the unit interior 26 when in use.

The hand held scaler 50 resembles a kitchen style cheese grader in shape and is also manufactured of high impact ABS plastic or some other equivalent material while a scaling scraper 57 is constructed of stainless steel. The overall dimensions of the completed hand held scaler 50 measures approximately one inch in height in the front 51, two inches in height in the rear 52, nine inches in length and five inches in width. The overall dimensions may vary without deviating from the purpose and intent of this invention. The front of the scaler 51 incorporates an oval shaped opening 53 which serves as a handle for the device when in use. Located on the top surface 61 along both long sides of the scaler is a pair of diametrically raised edges 54 which provide an angled protrusion to prevent the user's hand from contacting the fish or the scaler box 10 when in use. The rear of the scaler 52 embodies a crescent shape scooped scale deflector 55 the top of the scale deflector 56 serves to prevent fish scales from scattering into the air when the scaler is in use. The bottom of the scale deflector incorporates a blunt scaling style stainless steel edge 57 for the removal of scales from the fish. As scales are removed from the fish with the stainless steel edge 57 the scales tend to pop-off the fish and scatter, the top of the scoop scale deflector deflects the scattering scales so that they fell very close to the fish. The bottom surface 58 incorporates a concave curve for conforming to a body surface of a fish to be scaled. The bottom surface 58 also includes a series of vertically placed perforation style guides for spacers 59. The guides 59 allow the unit to move freely over a fish while the hand held scaler is in use. The number of guides may vary however the inventor has found that from about five to about nine spacers 59 are preferably spaced on the bottom surface of 58. When in use, the hand held scaler 50 removes scales from the fish and the scales are deflected by the scale deflector 55 and are either collected in a scoop scale collector area 60 which is in intermittently emptied onto the top surface 12 of the scaler box 10 or deflected directly to the top surface 12 and fall through the horizontal perforations 22 and into the interior of the scaler box 26.

The combination of use of the scaler box 10 and hand held scaler 50 provide a extremely efficient means for scaling fish indoors which prevent the fish scales from being scattered. The scaler box 10 as described above provides an effective means for collecting scales which are removed during the scaling process while the hand held scaler 50 removes scales to either a scale collector area 60 on the hand held scaler 50 or directly to the scale receptacle area 26 wherein all the scales are collected and easily cleaned. All of the components of the present invention may be manufactured by an injection molding process utilizing high impact plastic such as ABS. The stainless steel scaling edge on the hand held scaler may be incorporated into the ABS plastic by known methods of manufacture. All components may also be easily cleaned for storage by rinsing in a household sink.

It is noted that the embodiment of the Fish Scaling Device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Fish Scaling Device comprising a scaler box and a hand held scaler, the scaler box further comprising: a rectangular box shaped component which includes a top surface, front end, back end, bottom surface, an interior fish scale receiving area, the top surface of said scaler box further comprises a multiplicity of horizontally positioned indented bars which indentions resemble the profile of a fish shape, the indented bars extend transverse to a longitudinal length of the top surface of the rectangular box component, the multiplicity of horizontally positioned indented bars forms a multiplicity of horizontal elongated slotted perforations which provide passageways from an exterior of the rectangular box component top surface to the interior fish scale receiving area, a top front exterior of the scaler box incorporates an inverted "V" shaped plastic stop, which receives a fish head and further provides a means for preventing a fish from being pushed off the unit, the rear of the scaler box features a forward sliding plastic drawer running a length of the interior fish scale receiving area, the drawer provides a means for collecting and storing fish scales which pass through the multiplicity of horizontal elongated passageways, a front of the drawer includes a "U" shaped plastic handle which provides a means for gaining access to the unit interior fish scale receiving area; the hand held scaler is rectangular in shape and comprises: a front portion which includes an oval shape opening which serves as a handle, a top portion of the scaler includes two sides which include a pair of diametrically placed raised edges which provide a means for preventing a user's hand from contacting a fish or the scaler box component when in use, a rear portion of the scaler comprises a scoop scale deflector which resembles a crescent shape hollow half section which provides a means for deflecting removed fish scales and preventing removed fish scales from scattering, a bottom portion of the scoop scale deflector further comprises a blunt scaling edge which provides a means for removal of scales from a fish, a bottom portion of the scaler comprises a concave curved surface with a series of vertically placed raised guides which provide a means for allowing the hand held scaler to move freely over a fish when in use.

2. The Fish Scaling Device of claim 1, wherein said scoop scale deflector further comprises a means for collecting removed fish scales and a means for deflecting removed fish scales to the top surface of the scaler box so the removed fish scales are collected in the interior fish scale receiving area.

3. The Fish Scaling Device of claim 1, wherein: said blunt scaling edge further comprises a curved blunt stainless steel scaling edge.

4. The Fish Scaling Device of claim 1 wherein the top front exterior of the scaler box further comprises a securing strap extending over said inverted "V" shaped plastic stop, which securing strap provides a means for retaining the fish head within the "V" shaped plastic stop.

* * * * *